(12) United States Patent
Inami et al.

(10) Patent No.: US 10,823,224 B2
(45) Date of Patent: Nov. 3, 2020

(54) BEARING MEMBER, HOUSING, AND BEARING DEVICE USING THE SAME

(71) Applicant: DAIDO METAL COMPANY LTD., Nagoya, Aichi (JP)

(72) Inventors: Shigeru Inami, Inuyama (JP); Manabu Izumida, Inuyama (JP); Yukihiro Ito, Inuyama (JP); Takahito Nakagawa, Inuyama (JP)

(73) Assignee: DAIDO METAL COMPANY LTD., Nagoya (JP)

( * ) Notice: Subject to any disclaimer, the term of this patent is extended or adjusted under 35 U.S.C. 154(b) by 0 days.

(21) Appl. No.: 16/678,617

(22) Filed: Nov. 8, 2019

(65) Prior Publication Data

US 2020/0149582 A1   May 14, 2020

(30) Foreign Application Priority Data

Nov. 12, 2018 (JP) .................... 2018-212165

(51) Int. Cl.
*F16C 17/02* (2006.01)
*F16C 35/02* (2006.01)

(52) U.S. Cl.
CPC .............. *F16C 17/02* (2013.01); *F16C 35/02* (2013.01)

(58) Field of Classification Search
CPC .. F16C 9/02; F16C 9/04; F16C 17/022; F16C 33/046; F16C 35/02; F16C 2240/54; F16C 2360/22
See application file for complete search history.

(56) References Cited

U.S. PATENT DOCUMENTS 7,387,098 B2 * 6/2008 Waseda ................ F16C 13/006
                                                        123/90.51
2016/0131191 A1 * 5/2016 Sonobe .................. F16C 35/02
                                                         384/276

FOREIGN PATENT DOCUMENTS

JP          H10159853 A      6/1998

\* cited by examiner

*Primary Examiner* — Phillip A Johnson
(74) *Attorney, Agent, or Firm* — Karceski IP Law, PLLC

(57) ABSTRACT

A bearing member according to an embodiment of the present invention is formed into a single cylindrical shape or a cylindrical shape divided into arcs along a circumferential direction, and is assembled to a housing on an outer peripheral side of the bearing member. The bearing member includes an outer peripheral surface provided on a side opposed to an inner peripheral surface of the housing. A maximum height Rz (μm) of a surface roughness of the outer peripheral surface is set as 2.00 μm≤Rz≤4.00 μm, and a value of ratio between an average protruding-peak height Rpk (μm) and a load length rate Mr1 (%), that is a load curve parameter for the surface roughness is set as 0.010≤Rpk/Mr1≤0.100.

6 Claims, 6 Drawing Sheets

| ITEM | CONDITION |
|---|---|
| CLEARANCE | 0.050mm |
| TEST LOAD | 30kN |
| FREQUENCY | 60Hz |
| NUMBER OF CYCLES | 6 × 10^6 |
| TEMPERATURE | 150°C、180°C |

FIG.4

| RANK | EXTERNAL APPEARANCE | FRETTING DAMAGE |
|---|---|---|
| 5 | NO DAMAGE | ABSENT |
| 4 | MINUTE DAMAGE WITH WIDTH OF 1 mm OR LESS HAS OCCURRED | ABSENT |
| 3 | DAMAGE WITH WIDTH OF 1 mm OR GREATER HAS OCCURRED | ABSENT |
| 2 | MINUTE DAMAGE WITH WIDTH OF 1 mm OR LESS HAS OCCURRED ENTIRELY | PRESENT |
| 1 | DAMAGE WITH WIDTH OF 1 mm OR GREATER HAS OCCURRED ENTIRELY | PRESENT |

FIG.5

|  |  | SURFACE ROUGHNESS | | | | | EVALUATION RANK | | DAMAGE |
|---|---|---|---|---|---|---|---|---|---|
|  |  | Rz (μm) | Rpk/Mr1 | Rpk (μm) | Mr1 (%) | Rvk (μm) | 150°C | 180°C |  |
| EXAMPLE | SAMPLE 1 | 2.00 | 0.010 | 0.13 | 12.8 | 0.15 | 3 | 3 | ABSENT |
| | SAMPLE 2 | 3.00 | 0.050 | 0.77 | 15.4 | 1.10 | 4 | 3 | ABSENT |
| | SAMPLE 3 | 4.00 | 0.100 | 1.12 | 11.2 | 1.50 | 3 | 3 | ABSENT |
| | SAMPLE 4 | 2.00 | 0.010 | 0.16 | 16.0 | 0.20 | 4 | 4 | ABSENT |
| | SAMPLE 5 | 3.00 | 0.050 | 0.48 | 9.60 | 0.60 | 5 | 4 | ABSENT |
| | SAMPLE 6 | 4.00 | 0.100 | 0.96 | 9.60 | 1.00 | 4 | 4 | ABSENT |
| COMPARATIVE EXAMPLE | SAMPLE 7 | 0.50 | 0.005 | 0.13 | 26.0 | – | 1 | 1 | PRESENT |
| | SAMPLE 8 | 1.50 | 0.020 | 0.16 | 8.00 | – | 2 | 1 | PRESENT |
| | SAMPLE 9 | 3.00 | 0.150 | 0.48 | 3.20 | – | 2 | 1 | PRESENT |
| | SAMPLE 10 | 5.00 | 0.200 | 0.96 | 4.80 | – | 2 | 2 | PRESENT |

FIG. 6

BEARING MEMBER, HOUSING, AND BEARING DEVICE USING THE SAME

CROSS-REFERENCE TO RELATED APPLICATION(S)

This application is based on and claims priority to Japanese Patent Application No. 2018-212165, filed on Nov. 12, 2018, the content of which is incorporated herein by reference in its entirety.

BACKGROUND OF THE INVENTION

Field of the Invention

The present invention relates to a bearing member, a housing, and a bearing device using the bearing member and the housing.

Background of the Invention

In recent years, a reduction in weight of an engine has been required in order to further improve fuel efficiency. There is thus a tendency that each structure of the engine, such as a housing, has less rigidity in association with the reduction in weight. As a result of this, the housing of the engine tends to become deformed significantly during operation of the engine. In this engine, the housing holds a bearing member. Thus, there is a problem in that when the housing and the bearing member become deformed significantly during operation of the engine, slight relative slip vibrations occur between the outer peripheral surface of the bearing member and the inner peripheral surface of the housing, which leads to fretting damage.

Accordingly, it is known that a minute, rough-surfaced portion is formed on the outer peripheral surface of the bearing member or on the inner peripheral surface of the housing (see Japanese Patent Laid-Open No. 10-159853). With this technique, when a sliding member is assembled to the housing, a convex portion forming the rough-surfaced portion becomes deformed by being fastened by the housing. Due to this deformation of the rough-surfaced portion, the contact area between the outer peripheral surface of the bearing member and the inner peripheral surface of the housing is increased. This results in a reduction in slight relative slip vibrations between the housing and the bearing member, and accordingly fretting damage is lessened.

However, in a case where a minute, rough-surfaced portion is formed as disclosed in Japanese Patent Laid-Open No. 10-159853, a part of the convex portion of the rough-surfaced portion, which is not deformed at the time of assembly, becomes deformed during operation of the engine. Due to this deformation of the convex portion, the outer diameter of the bearing member is decreased. When the outer diameter of the bearing member is decreased, a gap is generated between the housing and the bearing member, which may become a cause of slight slip. There is a problem in that this gap causes slight relative slip vibrations between the housing and the bearing member, which accelerates the fretting damage.

Therefore, an object of the present invention is to provide a bearing member, a housing, and a bearing device using the bearing member and the housing, which reduce the amount of change in outer diameter of the bearing member and which lessen fretting damage due to slight relative slip vibrations.

SUMMARY OF THE INVENTION

In order to solve the above problems, in an embodiment of the present invention, a bearing member formed into a single cylindrical shape or a cylindrical shape divided into arcs along a circumferential direction, and assembled to a housing on an outer peripheral side of the bearing member, comprises an outer peripheral surface provided on a side opposed to an inner peripheral surface of the housing. A maximum height $Rz$ (μm) of a surface roughness of the outer peripheral surface is set as $2.00\ \mu m \leq Rz \leq 4.00\ \mu m$. A value of ratio between an average protruding-peak height $Rpk$ (μm) and a load length rate $Mr1(\%)$, that is a load curve parameter for the surface roughness is set as $0.010 \leq Rpk/Mr1 \leq 0.100$.

The maximum height $Rz$ (μm) of the surface roughness of the outer peripheral surface is set in this manner, to thereby reduce a distance from a valley to a peak of irregularities on the outer peripheral surface of a rough-surfaced bearing member. Thus, a convex portion of the rough-surfaced outer peripheral surface becomes mostly deformed at the time of assembly. Due to this deformation, only a small part of the convex portion becomes worn and deformed during operation, and there is a smaller change in shape of the outer peripheral surface during operation. This results in a reduction in the amount of change in outer diameter of the bearing member during operation, and minimizes formation of a gap which may become a cause of slight relative slip vibrations. Therefore, slight relative slip vibrations between the housing and the bearing member are reduced, and accordingly fretting damage can be lessened.

A value of the ratio between the average protruding-peak height $Rpk$ (μm) and the load length rate $Mr1(\%)$, that is a load curve parameter of the surface roughness is set in the manner as described above, so that a tip end of the convex portion forming the outer peripheral surface becomes almost flat. Thus, the contact area between the housing and the bearing member is increased. This results in an increase in friction force between the bearing member and the housing, and thus results in a reduction in slight relative slip vibrations between the bearing member and the housing. Accordingly, fretting damage can be lessened.

In the present embodiment, an average protruding-valley depth $Rvk$ (μm) that is a load curve parameter for the outer peripheral surface is preferably set as $0.20 \leq Rvk \leq 1.00\ \mu m$.

The average protruding-valley depth $Rvk$ (μm) that is a load curve parameter for the outer peripheral surface is set in this manner, so that the rough-surfaced outer peripheral surface secures a proper depth in a concave portion. This helps discharge abrasion powder to this concave portion, the powder being generated from the bearing member and the housing at the time of fastening, during operation, and the like. Therefore, the amount of deposits of the abrasion powder in a gap, where the outer peripheral surface of the bearing member is opposed to the inner peripheral surface of the housing, can be reduced.

In the present embodiment, the surface roughness may be set in the manner as described above for the inner peripheral surface of the housing, instead of the outer peripheral surface of the bearing member.

In the present embodiment, a bearing device comprises at least one of the bearing member and the housing. With this configuration, slight relative slip vibrations between the housing and the bearing member are reduced, and accordingly damage caused by fretting can be lessened.

BRIEF DESCRIPTION OF THE DRAWINGS

FIG. 4 is a schematic diagram showing test conditions of the bearing member according to one embodiment;

FIG. 5 is a schematic diagram showing evaluations of the bearing member according to one embodiment; and FIG. 6 is a schematic diagram showing test results of Example of the bearing member according to one embodiment and Comparative Example.

DETAILED DESCRIPTION OF THE PREFERRED EMBODIMENT

One embodiment of the present invention is described below with reference to the drawings.

First, descriptions are given of an engine to which a bearing device according to the present embodiment is applied. In the present embodiment, the bearing device is applied to the engine that is, for example, a diesel engine or a gasoline engine.

Figure 1:
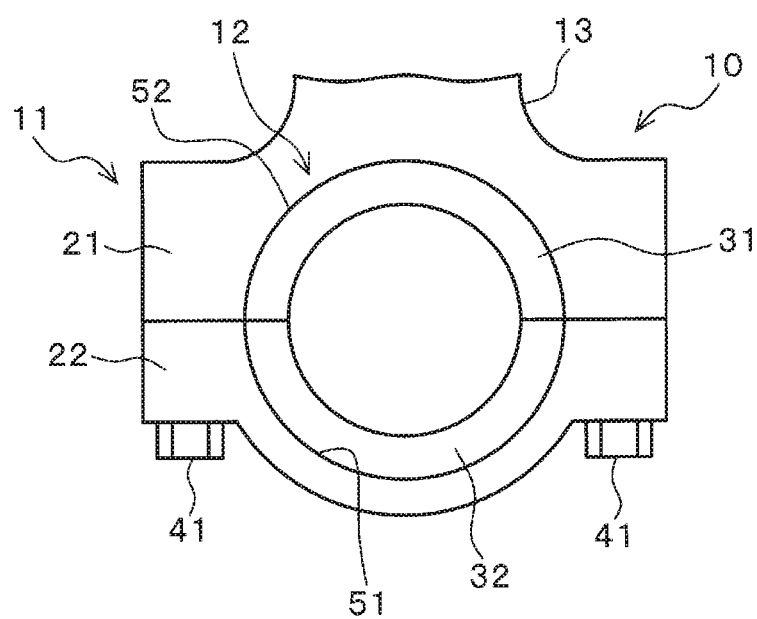
FIG. 1 is a schematic diagram showing a bearing device to which a bearing member according to one embodiment is applied.
Figure 2:
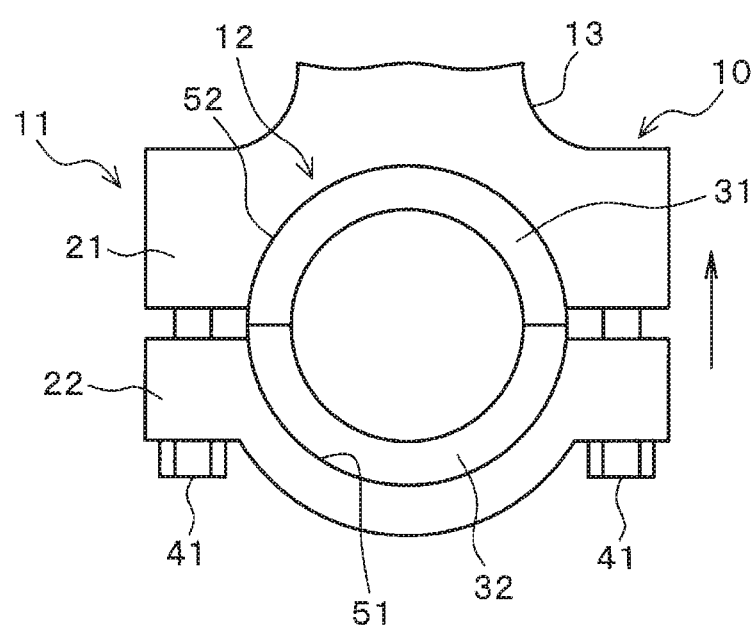
FIG. 2 is a schematic diagram showing assembly of the bearing device shown in FIG. 1.

As shown in FIGS. 1 and 2, a bearing device 10 includes a housing 11 and a bearing member 12. In the present embodiment, the housing 11 is a part of a connecting rod 13. The connecting rod 13 is connected to a piston (not shown) at an end on the opposite side to the housing 11 in a longitudinal direction of the connecting rod 13. The housing 11 includes an upper housing 21 and a lower housing 22 that are separable from each other. The lower housing 22 along with the upper housing 21 have the bearing member 12 accommodated therein. The bearing member 12 is accommodated between the upper housing 21 and the lower housing 22. The bearing member 12 is formed into a single cylindrical shape, or a cylindrical shape divided into arcs along a circumferential direction. In the example shown in FIGS. 1 and 2, the bearing member 12 is divided into two pieces so as to respectively have an upper member 31 and a lower member 32, each of which is a semi-cylindrical halved bearing.

The bearing member 12 divided into two pieces is accommodated between the upper housing 21 and the lower housing 22. The upper housing 21 and the lower housing 22, which separate from each other as shown in FIG. 2, are assembled into a single piece by a fastening member that is, for example, a bolt 41 as shown in FIG. 1. The bolt 41 passes through the lower housing 22 and is screwed into the upper housing 21, so that the upper housing 21 and the lower housing 22 are connected as a single piece, while holding the bearing member 12 divided into two pieces inside the upper housing 21 and the lower housing 22. The bearing member 12 has an outer perimeter that is set slightly greater than an inner perimeter of the housing 11. Thus, the upper housing 21 and the lower housing 22 are fastened by the bolt 41, and thereby the bearing member 12 receives a compressive stress. With this compressive stress, the bearing member 12 is rigidly fixed to the housing 11.

The bearing device 10 including the bearing member 12 is now described in detail.

In the present embodiment, the housing 11 is made up of the upper housing 21 and the lower housing 22, and includes a housing inner peripheral surface 51 that comes into contact with the bearing member 12 on the radially inner side of the housing 11. The bearing member 12 is made up of the upper member 31 and the lower member 32, and includes a bearing outer peripheral surface 52 that comes into contact with the housing 11 on the radially outer side of the bearing member 12. At least one of the housing inner peripheral surface 51 and the bearing outer peripheral surface 52 undergoes surface roughening. That is, at least one of the housing inner peripheral surface 51 and the bearing outer peripheral surface 52 is rough-surfaced with irregularities on the surface. In the present embodiment, surface roughening is performed on the bearing outer peripheral surface 52 of the bearing member 12.

Figure 3:
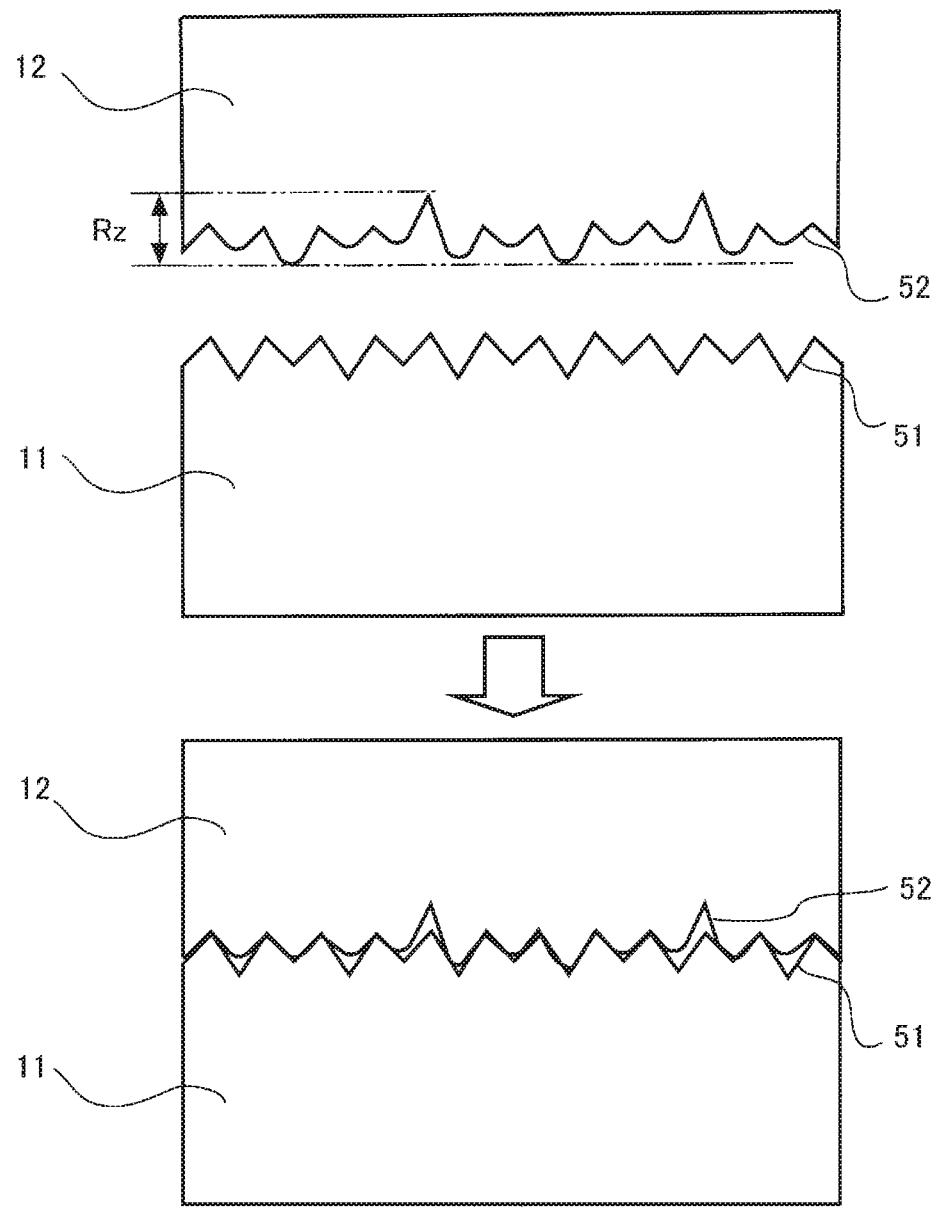
FIG. 3 is an enlarged schematic diagram of relevant parts of the bearing member according to one embodiment.

As shown in FIG. 3, a surface roughness of the bearing outer peripheral surface 52 according to the present embodiment is set as follows. That is, the surface roughness of the bearing outer peripheral surface 52 is set with the maximum height Rz (μm) of 2.00 μm≤Rz≤4.00 μm. A value of ratio Rpk/Mr1 between an average protruding-peak height Rpk (μm) and a load length rate Mr1(%), that is a load curve parameter for the bearing outer peripheral surface 52 is set as 0.010≤Rpk/Mr1≤0.100. The value of this ratio Rpk/Mr1 is a parameter calculated by dividing the average protruding-peak height Rpk on the load curve by the load length rate Mr1, and serves as an indicator indicating the surface shape of a rough-surfaced bearing outer peripheral surface 52. When the value of the ratio Rpk/Mr1 falls within the set range described above, that is, 0.010≤Rpk/Mr1≤0.100, the rough-surfaced bearing outer peripheral surface 52 has an obtuse angle that is almost a flat surface at a tip end of the convex portion. In other words, when the value of the ratio Rpk/Mr1 is 0.010≤Rpk/Mr1≤0.100, although the rough-surfaced bearing outer peripheral surface 52 has irregularities, the tip end of the convex portion is regarded as being in an almost flat state.

The maximum height Rz of the surface roughness is set as 2.00≤Rz≤4.00 μm, so that the rough-surfaced bearing outer peripheral surface 52 has smaller irregularities. Accordingly, at the time of assembling the bearing member 12 to the housing 11, a force is applied from the housing 11 to the bearing member 12, and then a major portion of the convex portion of the bearing outer peripheral surface 52 becomes deformed. This deformation lessens slight deformation of the irregularities on the rough-surfaced bearing outer peripheral surface 52 even when vibrations are applied during operation of the engine. As slight deformation of the bearing outer peripheral surface 52 is lessened, there is a smaller change in outer diameter of the bearing member 12. Consequently, this prevents formation of a minute gap between the housing 11 and the bearing member 12, which may become a cause of slight relative slip vibrations. Therefore, slight relative slip vibrations between the housing 11 and the bearing member 12 are reduced, and accordingly fretting damage is lessened.

The value of the ratio Rpk/Mr1 is set as 0.010≤Rpk/Mr1≤0.100 in the manner as described above, so that the tip end of the convex portion of the rough-surfaced bearing outer peripheral surface 52 becomes almost flat. This facilitates securing the contact area between the housing inner peripheral surface 51 and the bearing outer peripheral surface 52 when the bearing member 12 is assembled to the housing 11. That is, the tip end of the convex portion of the bearing outer peripheral surface 52 becomes almost flat, and thereby the bearing outer peripheral surface 52 has an increased contact area with the housing inner peripheral surface 51 compared to the case where the tip end is relatively sharp. This results in an increase in friction force between the housing 11 and the bearing member 12 which have been assembled with each other, and thus results in a reduction in slight relative slip vibrations between the housing 11 and the bearing member 12. Therefore, fretting damage can be further lessened.

In the present embodiment, an average protruding-valley depth Rvk (μm) that is a load curve parameter for the bearing outer peripheral surface 52 is set as 0.20 μm≤Rvk≤1.00 μm. When the bearing member 12 is assembled to the housing 11, fine abrasion powder is generated from the contact portion between the housing 11 and the bearing member 12 due to wear and the like. In addition, during operation of the engine, fine abrasion powder is generated from the contact portion between the housing 11 and the bearing member 12 in some cases. This abrasion powder generated from the contact portion deposits between the housing 11 and the bearing member 12, and then this causes undesired damage to or wear of the housing 11 and the bearing member 12. The average protruding-valley depth Rvk is set as 0.20 μm Rvk 1.00 μm as described in the present embodiment, so that the rough-surfaced bearing outer peripheral surface 52 secures a sufficient space in the concave portion. This helps discharge the abrasion powder, generated from the contact portion between the housing 11 and the bearing member 12, to the concave portion of the rough-surfaced bearing outer peripheral surface 52. This results in a reduction in slight relative slip vibrations between the housing 11 and the bearing member 12 caused by the abrasion powder during operation of the engine, and accordingly fretting damage is lessened.

Next, descriptions are given of a method for manufacturing the bearing member 12 to be used in the bearing device 10 configured as described above.

The bearing member 12 is formed by joining a bearing alloy layer made of, for example, Al, Cu, or alloy of Al and Cu, and a back metal layer made of steel. The bearing member 12 formed as described above may be formed with a plated layer made of, for example, Pb, Sn, Bi, or alloy of Pb, Sn, and Bi, on the inner peripheral surface facing a shaft member (not shown). The bearing member 12, made up of these bearing alloy layer and back metal layer, undergoes surface roughening on the bearing outer peripheral surface 52 opposed to the housing inner peripheral surface 51 of the housing 11. That is, in a case where the bearing member 12 includes a back metal layer, surface roughening is performed on the outer peripheral surface of the back metal layer.

Examples of the method of surface roughening to be performed on the bearing outer peripheral surface 52 include polishing, cutting, shot peening, and laser or cavitation shotless peening. The value of the ratio Rpk/Mr1 for the rough-surfaced bearing outer peripheral surface 52 is controlled by using, for example, polishing, cutting, or the like. The maximum height Rz of the surface roughness on the rough-surfaced bearing outer peripheral surface 52, and the average protruding-valley depth Rvk are controlled by, for example, shot peening, or laser or cavitation shotless peening. For example, as a shot material for the shot peening, metallic materials such as steel, stainless, Zn, and Al, or ceramic materials such as alumina, silicon carbide, and zirconia, or other materials such as glass and resin, can be used.

Example

Next, Example of the bearing member 12 described above is explained.

As shown in FIG. 6, each of samples 1 to 10 of the bearing member 12 was assembled to the housing 11 integral with the connecting rod 13 as shown in FIG. 1 to examine the bearing device 10 according to the present embodiment. The bearing member 12 was divided along the circumferential direction into two pieces, each of which was a semi-cylindrical halved bearing. In the present embodiment, the bearing member 12 with a cylindrical shape divided into two pieces has a seam that is set at a position perpendicular to the shaft of the connecting rod 13. Dimensions of the bearing member 12 were set including an outer diameter of 46 mm, a width of 16.5 mm, and a thickness of 1.5 mm. The bearing member 12 had a two-layered structure in which a bearing alloy layer made of copper alloy was stacked on a back metal layer made of carbon steel. The bearing outer peripheral surface 52 of the samples 1 to 10 of the bearing member 12 underwent shot peening after polishing to have a predetermined surface roughness for each individual sample. The connecting rod 13 was formed from carbon steel. The amount of oil clearance between the bearing member 12 and the shaft member (not shown) supported by the bearing member 12 was set to 0.050 mm. Individual parameters related to the surface roughness of the housing inner peripheral surface 51 were set respectively to Rz=1.60 μm, Rpk/Mr1=0.028, and Rvk=0.29 μm. Individual parameters related to the surface roughness of the bearing outer peripheral surface 52 of the samples 1 to 10 of the bearing member 12 were set as shown in FIG. 6. Among the samples 1 to 10, the samples 1 to 6 that satisfy the conditions in the present embodiment are Example articles according to the present embodiment. In contrast, the other samples 7 to 10 that do not satisfy the conditions in the present embodiment are Comparative Example articles.

Fretting-resistant properties of the bearing member 12 were evaluated by assembling the bearing member 12 to the housing 11, thereafter passing the shaft member (not shown) through the inside of the bearing member 12 to fix the shaft member to a test machine, and then repeatedly applying a vibratory load to one side of the housing 11. The evaluation conditions were set as shown in FIG. 4. That is, the vibratory load was set to 30 kN, the frequency was set to 60 Hz, the number of times of repetition was set to $6 \times 10^6$, and the vibration-test temperature was set to 150° C. and 180° C.

The fretting-resistant properties were evaluated by observing the external appearance of the bearing outer peripheral surface 52 of the bearing member 12 after the vibration test, and by focusing on the degree of damage to the external appearance. Specifically, the seam of the two divided pieces of the bearing member 12 was defined as 0° to detect the damage in the axial direction at a 30° to 50° position. Based on the detected damage, the fretting-resistant properties were evaluated using the "one" to "five"-stage evaluation ranking shown in FIG. 5. In this case, when the fretting-resistant properties were ranked "third" or greater, damage caused by fretting was determined to be "absent."

The damage was determined to be "absent" from the samples 1 to 6 that were Example articles regardless of the temperature condition. In contrast to this, the damage was determined to be "present" in the samples 7 to 10 that were Comparative Example articles regardless of the temperature condition.

The samples 1 to 6 that were Example articles had irregularities that were formed on the bearing outer peripheral surface 52 and that were set as 2.00 μm≤Rz≤4.00 μm. Thus, a major portion of the irregularities on the bearing outer peripheral surface 52 became deformed at the time of assembling the bearing member 12 to the housing 11. Accordingly, the deformation was lessened after assembly of the bearing member 12 to the housing 11. This resulted in a reduction in the amount of change in outer diameter of the bearing member 12, and thus resulted in a reduction in slight relative slip vibrations between the housing 11 and the bearing member 12 after the assembly. It is conceivable that with these reductions, fretting damage to Example articles was lessened.

In contrast to this, the sample 10 that was a Comparative Example article had Rz that was set as Rz>4.00 µm. It is thus conceivable that there was a greater change in outer diameter of the bearing member 12 after the bearing member 12 was assembled to the housing 11, and accordingly slight relative slip vibrations between the housing 11 and the bearing member 12 were not reduced after the assembly. The samples 7 and 8 that were Comparative Example articles had Rz that was set as Rz<2.00 µm. It is thus conceivable that the bearing outer peripheral surface 52 became deformed to a smaller extent at the time of assembling the bearing member 12 to the housing 11, and accordingly a reduction in the slight relative slip vibrations could not be achieved after the assembly.

Each of the samples 1 to 6 that were Example articles had a value of the ratio Rpk/Mr1 that was set as 0.010≤Rpk/Mr1≤0.100. Thus, the rough-surfaced bearing outer peripheral surface 52 had an almost flat shape at the tip end of the convex portion. This increased the contact area between the housing inner peripheral surface 51 and the bearing outer peripheral surface 52, and accordingly increased a friction force between the housing 11 and the bearing member 12. Consequently, it is conceivable that slight relative slip vibrations were reduced after the bearing member 12 was assembled to the housing 11, and also fretting damage was lessened.

In contrast, each of the samples 7 and 8 to 10 that were Comparative Example articles had a value of the ratio Rpk/Mr1, which falls out of the range 0.010≤Rpk/Mr1≤0.100. Thus, the contact area between the housing inner peripheral surface 51 and the bearing outer peripheral surface 52 was decreased, and accordingly a friction force between the housing 11 and the bearing member 12 was decreased. Consequently, it is conceivable that a reduction in the slight relative slip vibrations could not be achieved after the bearing member 12 was assembled to the housing 11.

Further, among the samples 1 to 6 that were Example articles, the samples 4 to 6, whose Rvk was set as 0.20 µm≤Rvk≤1.00 µm, showed a better evaluation rank compared to the samples 1 to 3. The samples 4 to 6, whose Rvk was set as 0.20 µm≤Rvk≤1.00 µm, secured a sufficient space in the concave portion of the bearing outer peripheral surface 52. This helped discharge abrasion powder generated at the time of assembling the bearing member 12 to the housing 11 or generated by vibrations after the assembly. In contrast, it is conceivable that the sample 1 that does not satisfy the above condition is likely to insufficiently discharge the abrasion powder.

Meanwhile, it is considered that when Rvk becomes Rvk>1.00 µm as shown by the samples 2 and 3, the concave portion of the bearing outer peripheral surface 52 becomes excessively large. The bearing outer peripheral surface 52 having such an excessively large concave portion is thought to cause a change in outer diameter of the bearing member 12 after the bearing member 12 is assembled to the housing 11.

In the above embodiment, the example has been described in which surface roughening is performed on the bearing outer peripheral surface 52 of the bearing member 12. However, surface roughening is not limited to being performed on the bearing member 12, but may also be performed on the housing inner peripheral surface 51 of the housing 11. Further, surface roughening may be performed on both the bearing outer peripheral surface 52 of the bearing member 12 and the housing inner peripheral surface 51 of the housing 11.

In the above embodiment, the example has been described in which the housing 11 and the back metal layer of the bearing member 12 are formed from steel. However, the housing 11 and the bearing member 12 may also be formed using a material with a smaller elastic modulus than carbon steel that is, for example, aluminum alloy, copper alloy, or titanium alloy. The housing inner peripheral surface 51 and the bearing outer peripheral surface 52 according to the present embodiment may undergo chemical treatment such as phosphating or etching, or may be provided with a metal coating made principally of Pb, Sn, Bi, Ag, Al or the like, with a DLC coating, with a resin coating, or with a ceramic coating.

The present invention described above is not limited to the aforementioned embodiment, and may be applicable to various embodiments without departing from the scope of the present invention.

What is claimed is:

1. A bearing member formed into a single cylindrical shape or a cylindrical shape divided into arcs along a circumferential direction and assembled to a housing on an outer peripheral side of the bearing member, the bearing member comprising:
    an outer peripheral surface provided on a side opposed to an inner peripheral surface of the housing,
    a maximum height Rz (µm) of a surface roughness of the outer peripheral surface is set as 2.00 µm≤Rz 4.00 µm, and
    a value of ratio between an average protruding-peak height Rpk (µm) and a load length rate Mr1(%), that is a load curve parameter for the surface roughness is set as 0.010≤Rpk/Mr1≤0.100.

2. The bearing member according to claim 1, wherein an average protruding-valley depth Rvk (m) that is a load curve parameter for the outer peripheral surface is set as 0.20 µm≤Rvk≤1.00 µm.

3. A bearing device comprising the bearing member according to claim 1.

4. A housing that holds a bearing member from an outer peripheral side of the bearing member, the bearing member being formed into a single cylindrical shape or a cylindrical shape divided along a circumferential direction, the housing comprising:
    an inner peripheral surface provided on a side opposed to an outer peripheral surface of the bearing member,
    a maximum height Rz (µm) of a surface roughness of the inner peripheral surface is set as 2.00 µm≤Rz≤4.00 µm, and
    a value of ratio between an average protruding-peak height Rpk (µm) and a load length rate Mr1(%), that is a load curve parameter for the surface roughness is set as 0.010≤Rpk/Mr1≤0.100.

5. The housing according to claim 4, wherein an average protruding-valley depth Rvk (µm) that is a load curve parameter for the inner peripheral surface is set as 0.20≤Rvk≤1.00 µm.

6. A bearing device comprising the housing according to claim 4.

* * * * *